United States Patent [19]

Sewards

[11] Patent Number: 4,694,297
[45] Date of Patent: Sep. 15, 1987

[54] REMOTE IDENTIFICATION DEVICE

[75] Inventor: Alan Sewards, Kanata, Canada

[73] Assignee: Her Majesty the Queen in right of Canada, as represented by the Minister of National Defence, Ottawa, Canada

[21] Appl. No.: 703,236

[22] Filed: Feb. 19, 1985

[30] Foreign Application Priority Data

Feb. 27, 1984 [CA] Canada ............... 448362

[51] Int. Cl.[4] ............................................ G01S 13/78
[52] U.S. Cl. ........................................ 342/45; 342/51; 342/6
[58] Field of Search ......... 343/6.5 R, 6.5 LC, 6.5 SS; 342/6, 42, 43–46, 50–51

[56] References Cited

U.S. PATENT DOCUMENTS

| 3,004,253 | 10/1961 | Wilson ......................... | 342/43 |
| 3,689,885 | 9/1972 | Kaplan et al. .................. | 342/42 X |
| 3,750,163 | 7/1973 | Hecker ........................... | 342/45 |
| 3,945,006 | 3/1976 | Cleeton .......................... | 342/45 |
| 4,114,151 | 9/1978 | Denne et al. .................... | 343/6.5 R |
| 4,167,007 | 9/1979 | McGeoch et al. ................ | 342/44 |
| 4,364,049 | 12/1982 | Moore et al. .................... | 342/43 |
| 4,513,285 | 4/1985 | Pike et al. ....................... | 343/6.5 LC X |

FOREIGN PATENT DOCUMENTS 2260115  8/1975  France .......................... 343/6.555

Primary Examiner—T. H. Tubbesing
Assistant Examiner—Bernarr Earl Gregory
Attorney, Agent, or Firm—Sheldon Kanars; Jeremiah G. Murray; Edward Goldberg

[57] ABSTRACT

The conventional way of achieving an identification, friend or foe (IFF) function for a moveable subject requires the subject to carry a transponder that emits a coded return when a radar pulse is received by its receiver. In the present invention, an IFF system is disclosed which departs from the conventional transponder method and employs no radio-frequency power source. Instead, it uses the scattering or reflecting properties of an antenna to modulate, in a distinctive manner, the radar return from a moveable subject. A binary sequence code generator modulates the impedance of a receiver antenna, with the reflected signal being detected and correlated with a synchronized code sequence at the radar.

7 Claims, 4 Drawing Figures

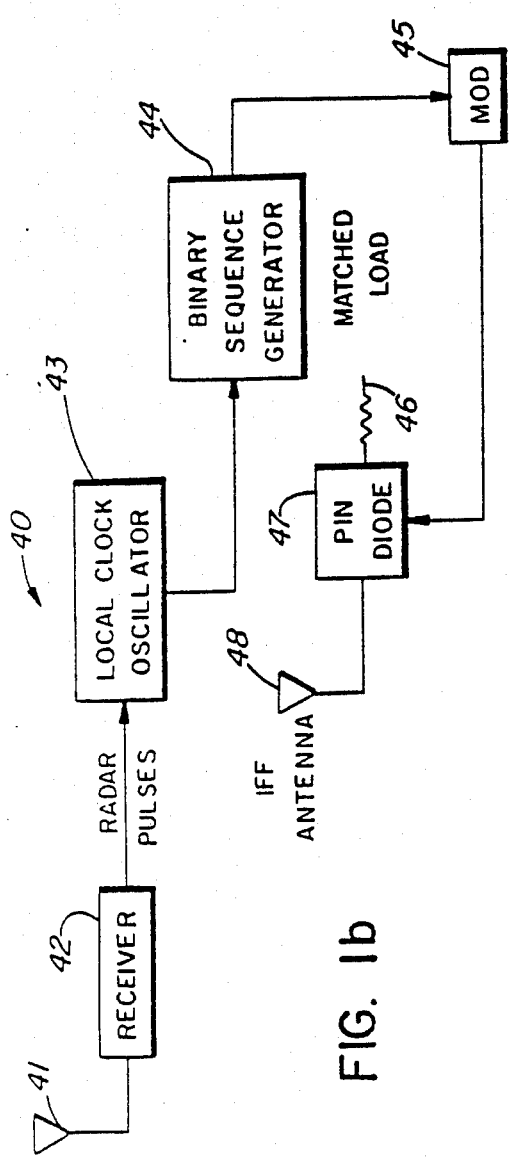
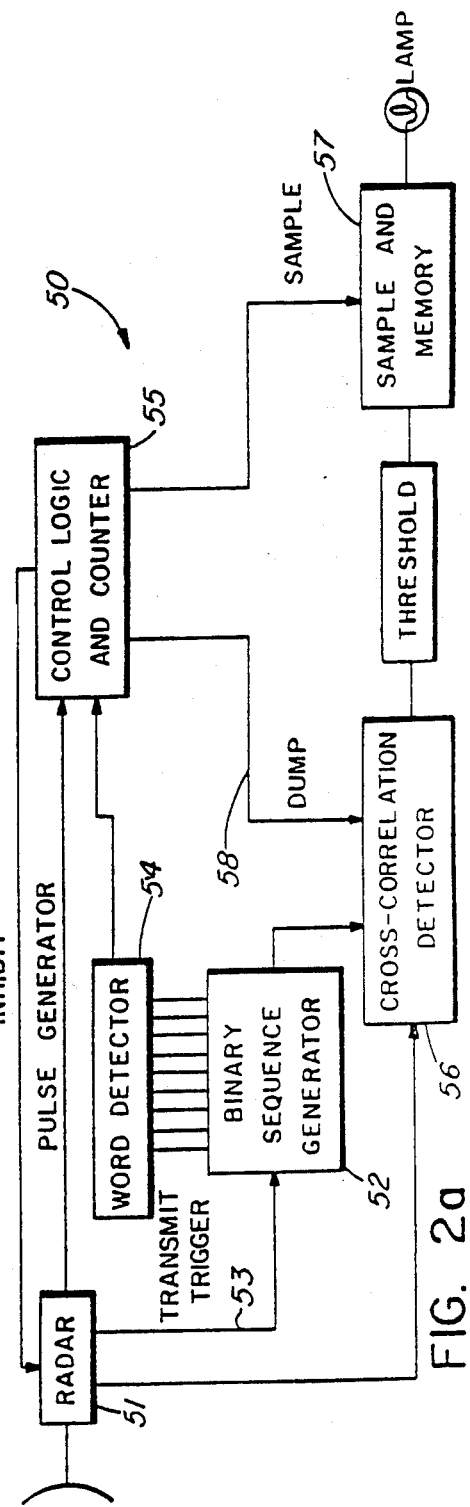
FIG. 1b
FIG. 2a

REMOTE IDENTIFICATION DEVICE

BACKGROUND OF THE INVENTION

1. Field of the Invention

This invention relates to identification systems of moveable subjects and specifically to identification, friend or foe, IFF systems.

The basic requirements for an IFF system can be reduced to the following:

(a) it shall give a positive identification of friendly targets when required;

(b) it shall have acceptably low false alarm and false dismissal probabilities;

(c) it shall possess an acceptable measure of security such that the response cannot be readily counterfeited by the enemy; and (d) it shall not endanger the respondent or be vulnerable to direction-finding receivers.

2. Description of the Prior Art

The conventional way to achieve an IFF function is for the moveable subject, such as an aircraft, to carry a transpoder that emits a coded return when a radar pulse is received by its receiver. This return transmission is normally on a different frequency from the radar, and is received at the radar site by a separate antenna and receiver. As the radiated return occurs simultaneously, or virtually so, with the reception of the radar signal, the range is related directly to the elapsed time, and the direction can be obtained by a suitably directive antenna. To obtain an adequate signal-to-noise ratio, a relatively high-power transponder transmitter is normally used of about 1 kw peak.

Such a system can be adapted directly for battlefield use, and meets all requirements stated above, except perhaps the last one. However, a separate antenna and receiver will have to be added to the radar and the moveable subject must carry a transponder, which raises problems of size, weight and power consumption. To minimize enemy detection, the transponder power output must be minimized and receiver antenna gain must be increased to compensate.

SUMMARY OF THE INVENTION

The present invention discloses an IFF system that departs from the conventional transponder method and employs no radio-frequency power source. Instead, it uses the scattering or reflecting properties of an antenna to modulate, in a distinctive manner, the radar return from a moveable subject. The identification signal is extracted from the existing radar receiver which obviates the need for a separate receiver and antenna. At the moveable subject, a receiver is employed to detect the presence of radar illumination and to pass the received radar pulses to a code generator which produces a binary sequence. This sequence, a train of ones and zeros, is then used to modulate the terminating impedance of the antenna by means of a PIN diode switch. The resultant radar echo, composed of the resultant of clutter, target and antenna scatter, is thus modified from pulse to pulse, depending on the output state of the code generator. At the radar, the presence of the binary sequence is detected by cross-correlation with an identical code generator, and when a sequence is detected, an indicator lamp is lit. the changes in the radar echo are below the background clutter noise and are not normally audible. In a battlefield environment, this reduces the possibility of detection by the enemy, and system privacy is ensured by the availability of a number of alternative sequences of the same length in bits which can be selected by switch settings.

In commercial applications, such a system can be used for the identification of vehicles such as buses, trucks, fleet cars, taxis, etc., passing a specific detection point on a road or highway.

The identification of vehicles on roads over a large area can be done by the use of satellite-borne or elevated platform means of interrogation.

On an airfield, the system described in this invention can also be used for identification of taxying aircraft, parked aircraft. and ground support vehicles, particularly in conditions of bad visibility.

Identification of ships manoeuvering in a harbour or a water way is also possible.

As can be seen from the above examples, the present invention can be useful in many applications.

This invention is based on the principle that a perfect antenna can collect all the plane wave energy incident upon it on its boresight axis and then convert this into an appropriate wave that appears at the output waveguide or conductor, subject to the obvious restrictions of frequency, polarization, etc. Under these conditions, no RF energy will be scattered, and if the source of energy is a radar that can detect scattered energy, it will not be able to detect the presence of the antenna. If the energy is incident upon the antenna from an angle off the boresight axis for a directional antenna, then perfect conversion will not take place, and some energy will be scattered.

Physically realizable antennas differ from this perfect one, considering now only the boresight axis case, in that scattering takes place at the interfaces between free space conditions and the antenna aperture and the antenna and feed. Most of the incident energy that is scattered is dependent on the type and design of the antenna and can be made very small.

If the output waveguide of a good antenna is terminated in a matched load, then an illuminating radar would detect only a small reflected signal, due to the interface scattering mentioned above. Termination of the antenna in a short circuit would cause all the intercepted energy to be re-radiated, and the radar would detect a substantial reflected signal. A variation in the impedance of the antenna termination can thus cause a variation in the energy back-scattered by the antenna and can be used for communications purposes.

It is therefore the primary object of the invention to provide a method and apparatus for use in a remote identification system for distinguishing a moveable subject from a group of moveable subjects comprising the steps of transmitting electromagnetic waves from a source towards an area where the moveable subject to be identified is located, receiving the electromagnetic waves by first receiving means at the moveable subject to be identified, varying the terminating impedance of an antenna on the moveable subject wherein the scattering cross-section of the antenna to an incoming signal is a function of the match of the antenna to that signal such that a reflected signal is produced, the reflected signal being modulated by the variations of the impedance in a manner which permit its detection by second receiving means located in an area where the reflected signal can be received, and detecting the modulated signal by detecting means in the second receiving means.

BRIEF DESCRIPTION OF THE DRAWINGS

FIG. 1b is a block diagram of a target receiving system with a passive synchronization;

FIG. 2a is a block diagram of a radar receiving system with active synchronization.

DESCRIPTION OF THE PREFERRED EMBODIMENTS

The synchronization problem is fundamental with communications systems using binary sequences, particularly if, as in this case, the signal is below noise level. Synchronization may be active or passive. For example, the transmitter may transmit or omit pulses or pulse trains solely for the purpose of synchronizing the code generators at the receiver and transmitter, or the receiver may vary the phase of its locally generated sequence until it locks to that radiated by the transmitter. In a communications system, a time period may be allotted to the synchronization process, varying from a fraction of a second to minutes. In the IFF system, synchronization constitutes reception of the message. It is important, therefore, to minimize the synchronization time, without involving excess complexity of equipment at the transmitter radar pulse train.

Figure 1A:
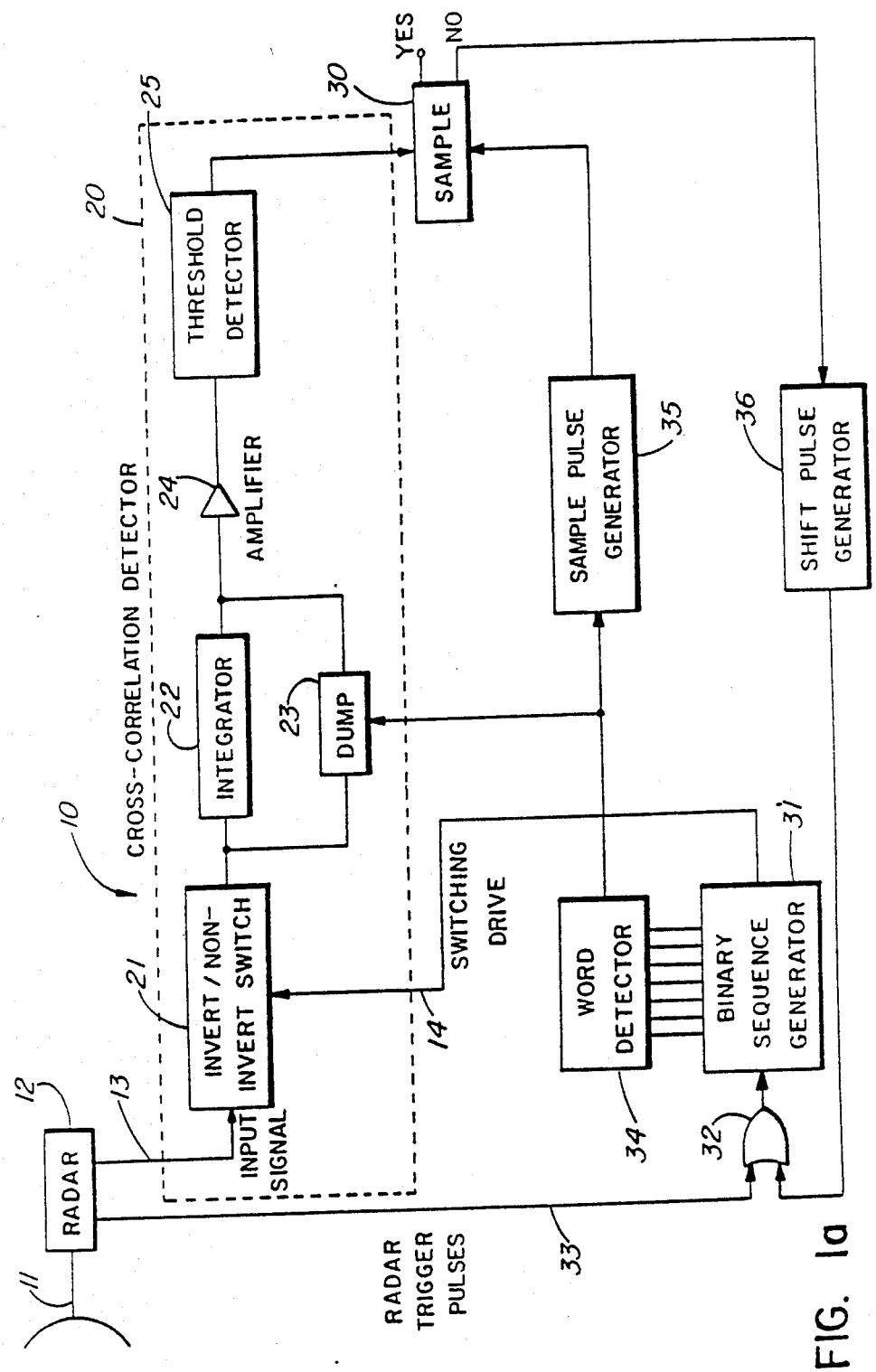
FIG. 1a is a block diagram of a radar receiving system with a passive synchronization.

Referring now to FIG. 1a, shown generally at numeral 10 is a radar receiving system having passive synchronization, wherein a code generator at the radar is synchronized passively by shifting its phase until detection occurs. The system of FIG. 1a receives the signals which are scattered by the moveable subject's antenna.

A radar receiver 12 receives a signal 11 and produces an output in the form of a range-gated boxcar video signal 13 which is fed to cross-correlation detector 20 and circuitry providing a locally produced binary sequence 14. In the detector 20, the signal 13 is applied to a switch 21 which passes the signal directly if the binary sequence 14 is a "1", or inverts the signal if it is a "0".

The switch output is passed to an integrator 22. The integrator output is amplified by amplifier 24 and is fed to a threshold detector 25 to provide a standard level before being sampled at sample circuit 30 at the completion of one binary sequence period. The integrator is then dumped by dump circuit 23. In this type of detector 20, any signals present at the input 13, except the sequence 14, tend to integrate to zero, including the residual sawtooth wave from the radar boxcar video signal 13.

The binary sequence at 14 is generated by a binary sequence generator 31 including a multi-stage shift-register via an exclusive-OR feedback circuit 32 clocked by the radar transmitter trigger pulses 33. At a particular shift register state, which is detected by a word-detector gate 34, a pulse produced by sample pulse generator 35 and the cross-correlation detector output is sampled and integrator 22 is dumped. If the sample output 30 indicates that no sequence is present, then an additional clock pulse is generated by shift pulse generator 36 and inserted at circuit 32 between radar trigger pulses 33, thus shifting the local sequence by one bit. This procedure is repeated until the sampled output 30 indicates the presence of a sequence in the boxcar output 13, in which case no shift pulse is produced and the system remains synchronized until the sample indicates that the signal has disappeared.

Referring now to FIG. 1b, shown generally at numeral 40 is a receiving system used at the moveable target having passive synchronization. The presence of a radar illumination is detected at an antenna 41 by receiver 42. The received radar pulses extracted from receiver 42 are fed to a local clock oscillator 43 used to avoid the loss of synchronism that could occur if just one radar pulse was missed. Pulses from oscillator 43 are use to clock an identical binary sequence generator 44 to that at the radar, generating a binary sequence. This sequence, a train of ones and zeros, is then used by modulator 45 to modulate the terminating impedance 46 of antenna 48 by means of a PIN diode switch 47. Since the scattering cross-section of antenna 48 is related to its terminating impedance 46, a resultant varying echo is produced. The resultant echo received at the radar, composed of the clutter, target and antenna scatter, is thus modified from pulse to pulse, depending on the output state of the code generator 44. It will be understood by those knowledgeable in this art that antenna 41 and 48 can be replaced by a single antenna to carry out both functions described above.

Figure 2B:
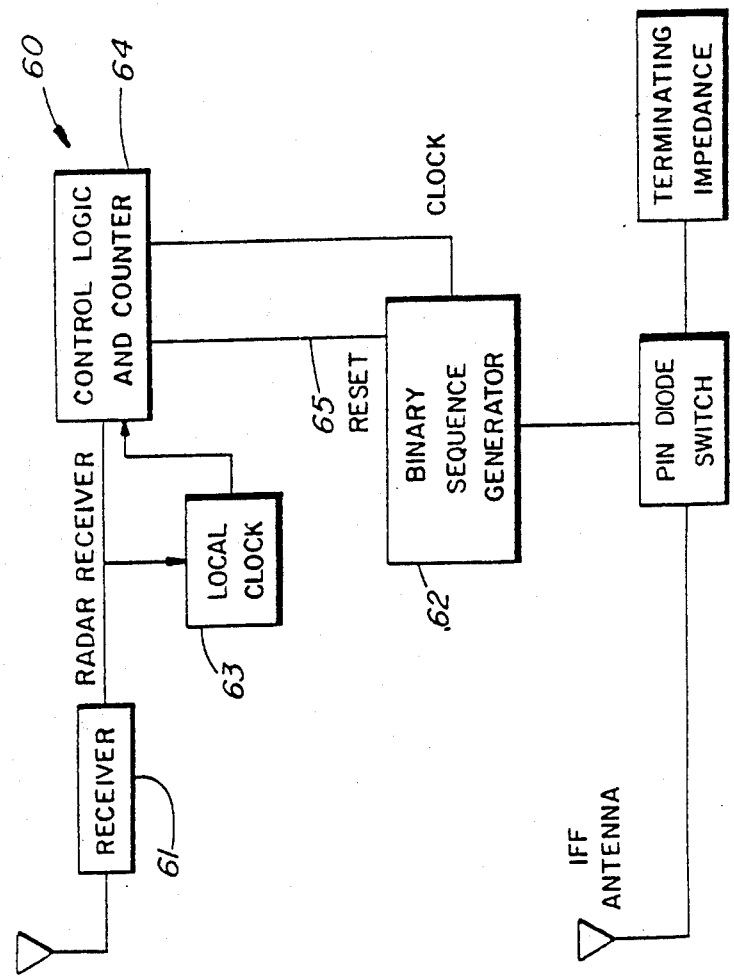
FIG. 2b is a block diagram of a target receiving system with active synchronization.

Shown generally at reference numeral 50 in FIG. 2a is a block diagram of a receiving system having active synchronization. In this system synchronization pulses are transmitted by the radar 51, enabling the binary sequence generator 52 of FIG. 2a and binary sequence generator 62 of FIG. 2b to be synchronized periodically. The system 50 uses the same cross-correlation detector as used in the passive synchronization system shown as 20 in FIG. 1a. The system operates with a binary sequence length of 1023 bits, produced by a 10-stage shift-register generator 52, but other sequence lengths can be chosen to meet particular needs. Synchronization of the binary sequence generators at the radar receiving system 50 and the moveable subject's receiving system 60 shown in FIG. 2b is achieved by interrupting the radar transmitted pulse train for five pulses every 1023 pulses.

At the time of the interrupt, the binary sequence generator in the radar is stopped in a particular shift-register state (1 000 000 000) and, at the moveable subject's receiver 61, the interruption is detected and the shift-register generator 62 is reset to the appropriate state, such that when radar transmissions are resumed, the two generators are synchronized. In operation, the binary sequence generator 52, which consists of a 10-stage shift-register with exclusive-OR feedback, is clocked by the radar transmitted trigger pulse 53. When a particular shift-register state occurs, as is observed by a word detector 54, an inhibit circuit (not shown) is activated via the control logic and counter 55. This stops further radar transmissions until five radar pulse generator pulses have been counted. During this time period the binary sequence generator is stopped with the shift-register in a particular state, and at the same time the cross-correlation detector output 56 is sampled by sample and memory circuit 57 and the integrator is dumped as indicated at 58. At the end of the count of five, the inhibit is removed, and when the next pulse occurs, radar transmission resumes.

At the moveable subject's receiving system 60, shown in FIG. 2b, a radar transmission is received at 61 and a local clock 63 is used, together with a counter 64, to detect a cessation in the radar transmission. A second missing pulse causes the local clock 63 to clear the binary sequence generator 62 to the initial state 65. After this time, no further clocking of the shift-register generator 62 is permitted by the local clock 63, and the system awaits reception of radar pulses. Thus, a minimum of four pulses is a required to synchronize the system. The system operation is the same as described earlier. Again, it will be understood by those knowledgeable in this art that a single antenna can be used to replace the two antennae described earlier. Both binary sequence generators employ 10-stage shift registers with feedback, as mentioned above. One of the properties of this type of generator is that a number of alternative sequences of the same period can be generated by simple changes of the taps and exclusive-OR gates. For different applications or situations where the signal to noise ratio is different from the case described, the length of the binary sequence can be selected appropriately.

Thus, there has been described a system for identifying a moveable subject by utilizing a useful property of the antennas, wherein their radar echoing areas can be varied simply by changing the match of the terminating impedance. A PIN diode can be employed to switch the terminating impedance between a short circuit and a matched condition. This property of variable echoing area can therefore be utilized as a means of communication between the site of the antenna of a moveable subject and a distant radar. A secure system can be devised if the antenna terminating impedance is modulated by a binary coded sequence, produced by a generator clocked by received radar pulses obtained from a receiver. The presence of the sequence can be detected by a cross-correlation detector, using an identical binary coded sequence generator. Synchronization of the binary sequence generator can be either passive or active.

What is claimed is:

1. An apparatus for distinguishing a moveable subject from a group of moveable subjects, comprising:
   transmitting means for transmitting electromagnetic signals towards a remote area where the moveable subject to be identified is located, said transmitting means including a local receiving means;
   remote receiving means for receiving said electromagnetic signals at said moveable subject to be identified, said moveable subject including an antenna;
   impedance varying means including means for generating a remote predetermined binary sequence code for varying the terminating impedance of said antenna on said moveable subject wherein the scattering cross-section of said antenna to an incoming signal is a function of the match of the antenna to that signal such that a scattered reflected signal is produced, said reflected signal being modulated by variations of said impedance, said local receiving means receiving said reflected signal;
   means for generating a local binary sequence code identical with said remote binary sequence code;
   detecting means for detecting said reflected modulating signal at said local receiving means, said detecting means including means for cross-correlating said reflected signal modulated by said remote binary sequence code with said local binary sequence code, said cross-correlating means including an invert-noninvert switch receiving an input signal from said transmitting means and from said local binary sequence code generator, an integrator coupled to said switch, an amplifier coupled to said integrator, and a threshold detector coupled to said amplifier;
   a sample circuit coupled to said threshold detector providing an indication of the presence or non-presence of said remote binary sequence code; and
   means for synchronizing said reflected and local coded signals.

2. The apparatus as defined in claim 1, wherein said remote receiving means includes a first antenna connected to a receiver to receive said electromagnetic signals and a second antenna having its impedance varied by said varying means to produce a modulated reflected signal.

3. The apparatus as defined in claim 1, wherein said remote receiving means includes said antenna.

4. the apparatus as defined in claim 1, wherein the impedance varying means includes a PIN diode switch modulated by said means for generating said remote binary sequence code.

5. The appartus as defined in claim 1 including means for generating a shift pulse to shift said local sequence for continued operation of said sample circuit.

6. The apparatus as defined in claim 1 including control logic means having inputs coupled to said transmitting means and said local binary sequence generator and an output coupled to said cross-correlating means, said sample circuit being coupled to said control logic means and to said cross-correlation means.

7. The apparatus as defined in claim 1 wherein said synchronizing means includes means in said transmitting means for generating trigger pulses coupled to said means for genertting said local binary sequence code, and said remote receiving means includes clock means receiving said trigger pulses.

* * * * *